United States Patent [19]
Nishimuro et al.

[11] Patent Number: 5,991,574
[45] Date of Patent: Nov. 23, 1999

[54] PHOTOSENSITIVE DRUM

[75] Inventors: Youichi Nishimuro, Kunitachi; Kunio Machida, Tokyo, both of Japan

[73] Assignee: Bridgestone Corporation, Tokyo, Japan

[21] Appl. No.: 09/185,599

[22] Filed: Nov. 4, 1998

[30] Foreign Application Priority Data

Nov. 10, 1997 [JP] Japan .................................. 9-323805

[51] Int. Cl.⁶ .................................................. G03G 15/00
[52] U.S. Cl. ............................................................ 399/159
[58] Field of Search ..................................... 399/159, 117

[56] References Cited

U.S. PATENT DOCUMENTS 5,768,943 6/1998 Kawata et al. .............................. 74/432

Primary Examiner—Matthew S. Smith
Assistant Examiner—Greg Moldafsky
Attorney, Agent, or Firm—Sughrue, Mion, Zinn, Macpeak & Seas, PLLC

[57] ABSTRACT

Disclosed is a photosensitive drum including: a cylindrical base body with a photosensitive layer formed on the outer peripheral surface thereof; and flanges respectively provided on both end surfaces of the cylindrical base body, the flanges being rotatably supported for rotatably supporting the photosensitive drum; wherein the cylindrical base body is molded from a conductive resin, and one of the flanges is molded from the conductive resin integrally with the cylindrical base body. The photosensitive drum, which contributes to a reduction in manufacturing cost by simplifying the manufacturing process and to improvement in reliability, is provided.

8 Claims, 2 Drawing Sheets

PHOTOSENSITIVE DRUM

BACKGROUND OF THE INVENTION

The present invention relates to a photosensitive drum used for forming on its surface an electrostatic latent image for formation of an image in an electrostatic recording process employed in an electrophotographic apparatus or electrostatic recording apparatus, for example, a copying machine, facsimile machine or printer.

An electrostatic recording process employed in a copying machine, facsimile machine or printer adopts the following printing procedure. First, an electrostatic latent image is formed on the surface of a photosensitive drum by uniformly electrifying the surface of the photosensitive drum and projecting an image from an optical system to the surface of the photosensitive drum to erase the electrification of a portion on which light has impinged. Then, toner is supplied to the electrostatic latent image to form a toner image by electrostatic adhesion of the toner, and the resultant toner image is transferred on a recording medium such as a piece of ordinary paper, OHP, or photographic paper.

A related art photosensitive drum used for such an electrostatic recording process generally has a structure shown in FIG. 3.

Referring to FIG. 3, there is shown the related art photosensitive drum including a cylindrical base body 1 made from a metal such as aluminum or a conductive resin, to both ends of which are fixedly fitted flanges 2a and 2b made from a metal or resin. In addition, on the outer peripheral surface of the cylindrical base body 1 is formed a photosensitive layer 3. In general, as shown in FIG. 3, the photosensitive drum is rotatably supported by inserting supporting shafts 4, provided on a main body a of an electrostatic recording apparatus, into shaft holes 5 provided in both the flanges 2a and 2b, respectively; and the drum is rotated by meshing a gear 7, connected to a drive source such as a motor, with a drum driving gear 6 formed around one flange 2b.

The photosensitive drum must be grounded to electrify the photoconductive layer 3 of the photosensitive drum and form an electrostatic latent image on the photoconductive layer 3 by exposure. The related art photosensitive drum, if it has the flanges 2a and 2b made from an insulating resin, is earthed to the apparatus main body a via an earthing metal plate provided on the inner surface side of one of the flanges for bringing the cylindrical base body 1 into conduction with the corresponding one of the supporting shafts 5.

The above-described related art photosensitive drum, however, has problems. Since the photosensitive drum is assembled by fixedly fitting the flanges 2a and 2b to both ends of the cylindrical base body 1, the flange assembling work must be repeated twice for assembling the flanges 2a and 2b to both ends of the cylindrical base body 1. Also since the cylindrical base body 1 and the flanges 2a and 2b are formed separately from each other, each of these parts must be formed with high processing accuracy, thereby increasing the manufacturing cost of the photosensitive drum.

In the case of the related art photosensitive drum requiring the above earthing metal plate, a work of mounting the earthing metal plate must be additionally performed, to thereby further increase the manufacturing cost; and also good conduction between the metal plate and the supporting shaft 5 is possibly lost due to wear of the metal plate during operation of the photosensitive drum, with a result that it is difficult to ensure sufficient reliability of the drum for a long period of time.

SUMMARY OF THE INVENTION

In view of the foregoing, the present invention has been made, and an object of the present invention is to provide a photosensitive drum capable of simplifying the manufacturing process to thereby lower the manufacturing cost, and also enhancing the reliability of the photosensitive drum.

To achieve the above object, according to an aspect of the present invention, there is provided a photosensitive drum including: a cylindrical base body with a photosensitive layer formed on the outer peripheral surface thereof; and flanges respectively provided on both end surfaces of the cylindrical base body, the flanges being rotatably supported for rotatably supporting the photosensitive drum; wherein the cylindrical base body is molded from a conductive resin, and one of the flanges is molded from the conductive resin integrally with the cylindrical base body.

In the photosensitive drum of the present invention, one side of the flanges provided on both ends of the cylindrical base body is molded from a conductive resin integrally with the cylindrical base body, accordingly, the flange assembling work is performed only once for assembling a flange, formed separately from the cylindrical base body, of the other end portion of the cylindrical base body. Also, good conduction between one of the supporting shafts for rotatably supporting the drum and the cylindrical base body can be certainly obtained via the flange molded from the conductive resin integrally with the cylindrical base body, with a result that it is possible to eliminate the necessity of provision of the above-described earthing metal plate and to ensure a high reliability of the drum. Further, since the one flange is molded integrally with the cylindrical base body, it can be formed with high processing accuracy.

In this way, according to the present invention, there can be obtained a photosensitive drum capable of lowering the manufacturing cost by omitting a part of the manufacturing process and also enhancing the reliability thereof.

DETAILED DESCRIPTION OF THE PREFERRED EMBODIMENTS

Figure 1:
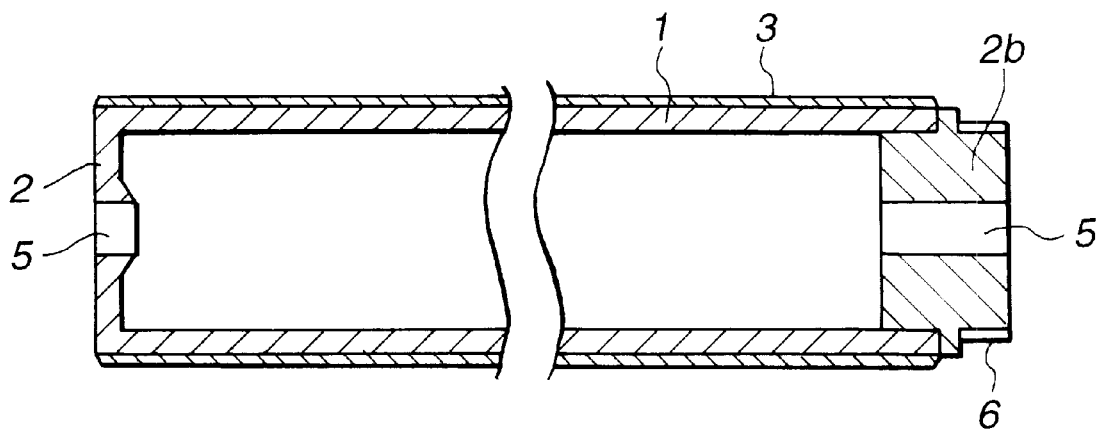
FIG. 1 is a schematic sectional view showing a photosensitive drum according to one embodiment of the present invention.
Figure 2:
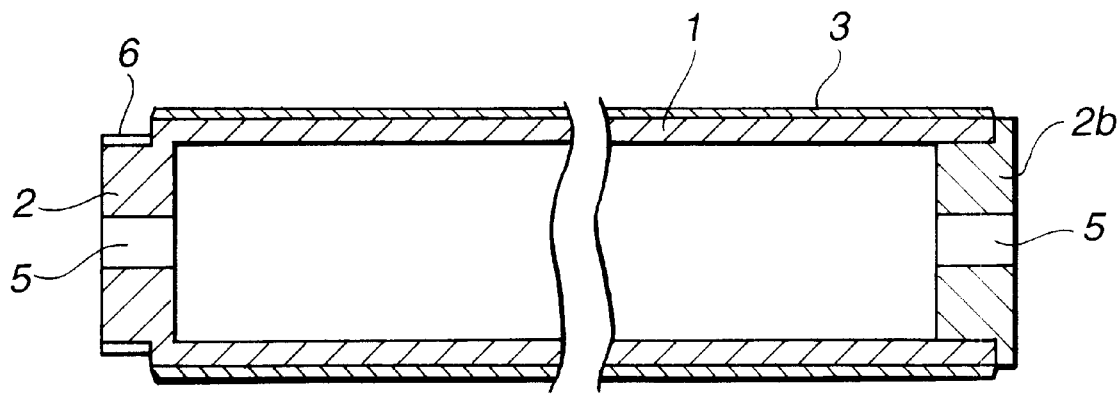
FIG. 2 is a schematic sectional view of a photosensitive drum according to another embodiment of the present invention.

The photosensitive drum of the present invention is, as described above, characterized by integrally molding a cylindrical base body with one of the flanges from a conductive resin. Referring to FIGS. 1 and 2, there are shown photosensitive drums according to embodiments of the present invention, in each of which a flange 2 for closing one end surface of a cylindrical base body 1 is molded from a conductive resin for forming integrally with the cylindrical base body 1. A flange 2b formed separately from the cylindrical base body 1 is fixedly fitted to the other end portion of the cylindrical base body 1 to close the other end surface of the cylindrical base body 1. Shaft holes 5 are formed in the central portions of both the flanges 2 and 2b, respectively. In addition, reference numeral 3 denotes a photoconductive layer formed on the outer peripheral surface of the cylindrical base body 1. The photosensitive layer 3 can be made from a known material having a known composition.

As for the conductive resin used for molding the cylindrical base body 1 integrally with flange 2, there is generally used a conductive resin which is added with a conductive agent for imparting a conductivity thereto. The resin is not particularly limited, so that it may be selected from those having suitable strengths and capable of being formed by injection-molding or the like. According to the present invention, while not exclusively, there are preferably used thermoplastic resin, for example, polycarbonate, polyethylene terephthalate, polybutylene terephthalate, polyamide (nylon 6, nylon 66 or the like), polyphenylene sulfide (PPS), or polyacetal because these are good in moldability, mechanical strength, sliding characteristic and the like.

The conductive agent may be selected from those capable of being uniformly dispersed in the above-described resin. According to the present invention, while not exclusively, there is preferably used a powder of carbon black, graphite, metal such as aluminum, copper or nickel, or a powder of conductive glass. The content of the conductive agent may be in a range of 5 to 40 wt %, preferably 5 to 20 wt % for adjusting the volume resistivity of the cylindrical base body and the flange 2 in a range of $10^4 \Omega \cdot cm$ or less, preferably $10^2 \Omega \cdot cm$ or less.

The conductive resin may have fibers added as a filler for reinforcement or weighting. As for the fibers, there may be used either conductive fibers such as carbon fibers, conductive whiskers or conductive glass fibers, or non-conductive fibers such as whiskers or glass fibers. In this case, since the conductive fibers function as a conductive agent, the necessary amount of the above-described conductive agent can be reduced by use of the conductive fibers; however, in terms of cost efficiency, it is desirable to use the non-conductive fibers although the use of the non-conductive fibers does not contribute to the reduction in the necessary amount of the conductive agent.

The content of the fibers as the filler is suitably selected depending on the type of the resin, and average length and diameter of the fibers used therein. According to the present invention, while not exclusively, the content may be generally in a range of 2 to 25 wt %, preferably, in a range of approximately 5 to 15 wt %.

To the conductive resin may be added, other than the above-described conductive agent and filler, a known additive such as PTFE (polytetrafluoroethylene), silicon or molybdenum disulfide ($MoO_2$) in a suitable amount, as needed.

The method of molding the cylindrical base body 1 and the flange 2 using the above conductive resin may be suitably selected depending on the kind of the resin used; however, in general, molding is performed in accordance with a known injection-molding process using the above thermoplastic resin. The molding condition such as a molding temperature or injection pressure may be selected from ordinary conditions depending on the kind of the resin used.

In the photosensitive drum of the present invention in which the cylindrical base body 1 and the flange 2 are integrally molded from the above conductive resin, as shown in FIG. 1, the drum driving gear 6 may be molded integrally with the flange 2b molded from the conductive resin. Alternatively, as shown in FIG. 2, a short-sized columnar projecting portion may be formed on the outer surface of the flange 2 and the drum driving gear 6 may be formed on the outer peripheral surface of the projecting portion.

The surface roughness of the outer peripheral surface of the cylindrical base body 1 may be, while not exclusively, in a range of 1.6 μm or less, preferably, 0.8 μm or less in Ra (center line average roughness). When the value Ra is more than 1.6 μm, irregularities of the surface of the cylindrical base body 1 emerge on the photoconductive layer 3, tending to cause a failure in formation of an image. It should be noted that the surface roughness of the outer peripheral surface of the cylindrical base body 1 can be adjusted by polishing the surface after molding of the cylindrical base body 1.

In the photosensitive drum of the present invention in which the cylindrical base body 1 and the flange 2 are integrally molded, as shown in FIGS. 1 and 2, the flange 2b formed separately from the cylindrical base body 1 is fixedly fitted to the other end portion of the cylindrical base body 1. The other flange 2b may be made from any material selected from metals, conductive resins and non-conductive resins; however, in consideration of the strength and balance in conductivity between both the flanges, the other flange 2b is preferably molded from the same conductive resin as that used for molding the cylindrical base body 1 and the flange 2. It should be noted that the other flange 2b may be fixed using an additive as needed. Further, as shown in FIG. 1, in the case where the drum driving gear 6 is not provided on the flange 2 molded integrally with the cylindrical base body 1, the driving gear 6 may be provided around the other flange 2b.

Figure 3:
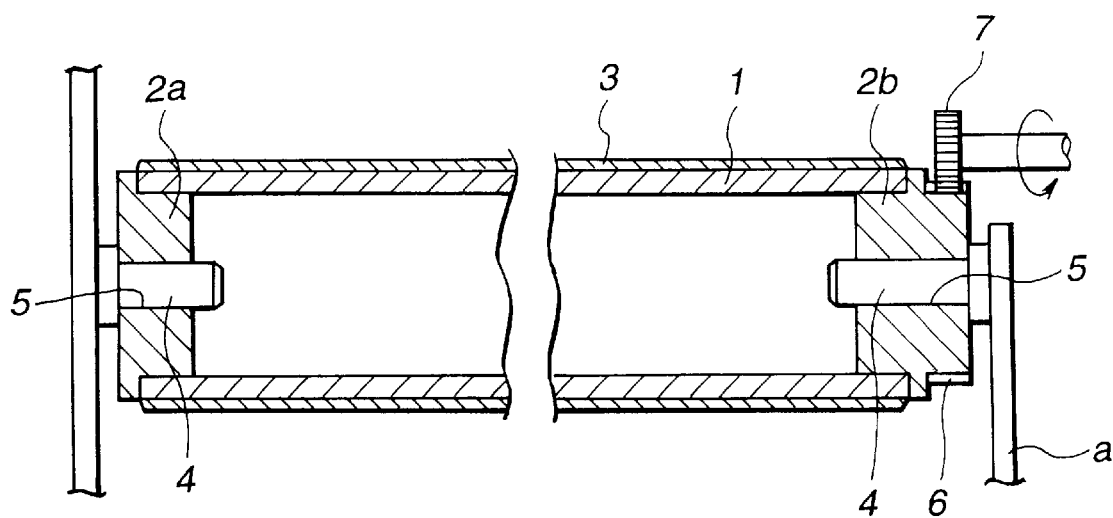
FIG. 3 is a schematic sectional view showing a related art photosensitive drum.

The photosensitive drum of the present invention is rotatably supported, via the flanges 2 and 2b rotatably supported, in an electrostatic recording apparatus such as copying machine, facsimile machine or a printer, and is used for formation of an image. In this case, like the related art photosensitive drum shown in FIG. 3, the photosensitive drum of the present invention is rotatably supported by inserting supporting shafts provided on a main body of the electrostatic recording apparatus in shaft holes 5 provided in the central portions of the flanges 2 and 2b, and is rotated by meshing a gear connected to a drive source such as a motor to the drum driving gear 6 formed on the flange 2 or the other flange 2b.

The configuration of the photosensitive drum of the present invention is not limited to those shown in FIGS. 1 and 2. For example, outward projecting shaft bodies (supporting shafts) may be provided on the flanges 2 and 2b in place of the shaft holes 5, whereby the photosensitive drum can be turnably mounted to the main body of the electrostatic recording apparatus. In this case, the shaft body projectingly provided on the flange 2 may be molded from the conductive resin integrally with the flange 2. Further, the other elements of the configuration such as the shape of each of the flanges 2 and 2b can be suitably changed without departing from the scope of the present invention.

EXAMPLE

The present invention will be more clearly understood using, but not limited to, the following example.

Example

A sample of a photosensitive drum was prepared by injection-molding, under the following conditions; a conductive resin containing a basic resin selected from those shown in Table 1, fibers of one kind selected from those shown in Table 1, and carbon black, to form a cylindrical base body integrated with one flange, and the cylindrical base body is fixedly fitted to the other flange molded from the same conductive resin. The photosensitive drum thus prepared has the same shape as that shown in FIG. 1, more specifically, it has the outside diameter of 30 mm, the inside diameter of 26 mm, and the length of 232.5 mm. The above-described procedure was repeated to prepare eight samples shown in Table 1 (Drum Nos. 1 to 8). In addition, the formation of the photoconductive layer 3 on each drum was omitted. Then, each drum was subjected to measurement in terms of volume resistivity, surface roughness and dimensional accuracy of the drum main body composed of the cylindrical base body 1 and the flanges 2 and 2b. The results are shown in Table 1. In addition, each measurement was performed in accordance with the following manner.

TABLE 1

| Drum No. | | 1 | 2 | 3 | 4 | 5 | 6 | 7 | 8 |
|---|---|---|---|---|---|---|---|---|---|
| Resin | nylon 66 | 80 | 80 | 75 | | | 70 | 50 | |
| | polyphenylene sulfide | | | | 80 | 70 | | | 86 |
| Fiber | carbon fiber | 10 | | | 15 | | 30 | | |
| | conductive whisker | | 10 | | | | | | |
| | glass fiber | | | 5 | | 10 | | 30 | 10 |
| Carbon Black | | 10 | 10 | 20 | 5 | 20 | | 20 | 4 |
| Volume Resistivity ($\Omega \cdot cm$) | | $10^0-10^1$ | $10^1-10^2$ | $10^2-10^3$ | $10^1-10^2$ | $10^2-10^3$ | $10^0-10^1$ | $10^2-10^3$ | $10^8-10^9$ |
| Surface Roughness Ra ($\mu m$) | | 0.2 | 0.1 | 0.3 | 0.5 | 0.6 | 1.8 | 2.0 | 0.6 |
| Dimensional Accuracy | | ○ | ○ | ○ | ○ | ○ | △ | △ | ○ |
| Test Conclusion | | ○ | ○ | ○ | ○ | ○ | △*1 | △*1 | △*2 |

*Mixing ratio, determined in wt %
*1 Larger surface roughness and slightly poor dimensional accuracy
*2 Excessively large resistivity Molding Condition

| | Molding Condition | |
|---|---|---|
| | molding temperature | injection pressure |
| nylon 66 | 260–290° C. | 500–900 kg/cm$^2$ |
| PPS | 270–300° C. | 600–1200 kg/cm$^2$ |

Measurement (1) Volume Resistivity: measured using four-probe type resistivity measurement device (trade name: Rolester IP, MCP-T250, produced by Mitsubishi Yuka K. K.)
(2) Surface Roughness: measured using surface roughness/contour measurement device (trade name: Surfcom 470, produced by Tokyo Seimitsu Co., Ltd.)
(3) Dimensional Accuracy (*): measured using three-dimensional coordinate measurement device (trade name: Zaizacs RVA600, produced by Tokyo Seimitsu Co., Ltd.)

(*): The dimensional accuracy was determined as being good when the roundness was in a range of 0.01 to 0.03 mm; the concentricity was in a range of 0.01 to 0.03 mm; and the straightness was in a range of 0.02 to 0.04 mm.

As is apparent from the results shown in Table 1, from the viewpoints of dimensional accuracy, surface roughness Ra (suitable range: 1.6 $\mu$m or less), and resistivity (suitable range: $10^4 \Omega \cdot cm$ or less), it was confirmed that the desirable formula of the filler (fibers) was in a range of 2 to 25 wt % and the desirable formula of the conductive agent (carbon black) was in a range of 5 to 20 wt %.

We claim:

1. A photosensitive drum comprising:
   a cylindrical base body with a photosensitive layer formed on the outer peripheral surface thereof; and
   flanges respectively provided on both end surfaces of said cylindrical base body, said flanges being rotatably supported for rotatably supporting said photosensitive drum;
   wherein said cylindrical base body is molded from a conductive nylon resin, and one of said flanges is molded from said conductive nylon resin integrally with said cylindrical base body.

2. A photosensitive drum according to claim 1, wherein a gear for driving said photosensitive drum is molded from said conductive resin integrally with said one of said flanges which is molded from said conductive nylon resin.

3. A photosensitive drum according to claim 1, wherein each of said flanges has a shaft hole into which a supporting shaft is inserted, whereby said photosensitive drum is rotatably supported by said supporting shafts.

4. A photosensitive drum according to claim 1, wherein a supporting shaft is projectingly provided on each of said flanges, whereby said photosensitive drum is rotatably supported by said supporting shafts.

5. A photosensitive drum according to claim 1, wherein said conductive nylon resin is nylon 6 or nylon 66 containing a conductive agent.

6. A photosensitive drum according to claim 5, wherein said conductive agent is added in a range of 5 to 40 wt %.

7. A photosensitive drum according to claim 1, wherein said conductive nylon resin includes fibers.

8. A photoconductive drum according to claim 7, wherein said fibers are added in a range of 2 to 25 wt %.

* * * * *